No. 686,958. Patented Nov. 19, 1901.
F. W. STROUDLEY.
STAY FOR FIRE BOXES IN LOCOMOTIVE, MARINE, OR OTHER BOILERS.
(Application filed May 16, 1901.)
(No Model.)
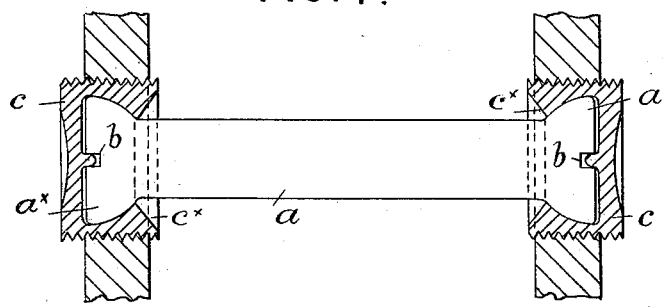
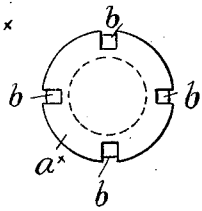
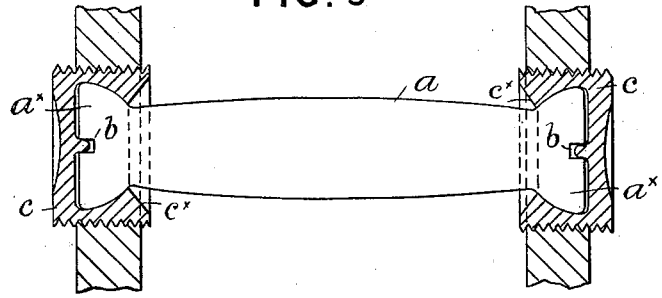
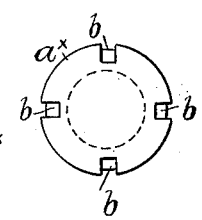
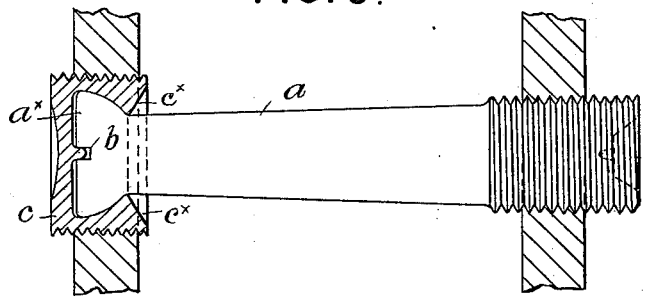
WITNESSES:
F. W. Wright
S. C. Connor
INVENTOR
FREDERICK WM. STROUDLEY.
BY Howson and Howson
HIS ATTORNEYS.

UNITED STATES PATENT OFFICE.

FREDERICK WILLIAM STROUDLEY, OF DIDSBURY, NEAR MANCHESTER, ENGLAND.

STAY FOR FIRE-BOXES IN LOCOMOTIVE, MARINE, OR OTHER BOILERS.

SPECIFICATION forming part of Letters Patent No. 686,958, dated November 19, 1901.

Application filed May 16, 1901. Serial No. 60,556. (No model.)

*To all whom it may concern:*

Be it known that I, FREDERICK WILLIAM STROUDLEY, a subject of the King of Great Britain, residing at Mildura, Clothorne road, Didsbury, near Manchester, in the county of Lancaster, England, have invented new and useful Improvements in Stays for Fire-Boxes in Locomotive, Marine, or other Boilers, of which the following is a specification.

This invention relates to improvements in the formation and manner of fixing stays in the fire-boxes of locomotive, marine, and other boilers.

The objects of my invention are to avoid leakage caused by contraction and expansion and the destruction of the ends of the stays when exposed to the intense heat of the fire.

In the accompanying drawings, Figure 1 is a side view, partly in section, and Fig. 2 an end view, of my improved stay. Figs. 3 and 4 are like views of the same slightly modified, and Fig. 5 is also a modification.

In the views similar letters refer to similar parts.

For the purpose of this invention I form a stay, as $a$, either straight, as shown in Fig. 1, or swelled in the center, as shown in Fig. 3, and with a head, as $a^\times$, at each end. The under portions of said heads are curvilinear in formation or elliptical, and the outer or face ends are flat, but have either recesses, as $b$, formed therein or projections formed thereon. I provide steel or other metallic sockets $c$ to place on over the ends of the stays to screw into the plates of the fire-box and also into the inside plate. I either cast these sockets on over the heads or enlarged ends $a^\times$ of the stay or I forge the socket $c$ with an enlarged opening, and after placing the head of the stay therein I swage it down onto the smaller portion of the stay to form a retaining-lip, but not to bind closely on the stay. The metal on the inside of the socket will, if cast, run into the recesses $b$ or will flow around any projections on the end of the stay, or if the socket $c$ is a forging either projections or recesses may be formed therein or the metal may be pressed more or less into the recesses $c$, or if the face end of the stay has projections thereon said projections will be embedded in the interior of the forged socket, which although not unmovably fixed on the stay cannot be turned around thereon. The face of the socket is either flat or slightly concave. I form a screw-thread on the periphery of the aforesaid socket and a corresponding screw-thread in holes drilled both in the shell-plate and also in the inside plate. In applying my invention I screw the socket on one end of the stay into one of the holes of one of the plates until it is free therefrom and then pass the stay through and screw it into the plate on the opposite side, at the same time screwing the other end of the stay into the plate previously named. By these means an efficient stay is provided, as the greater the pressure between the plates the more firmly are said sockets retained in the plates, due to the tendency of the head of the stay to expand the inner swaged-over ends and causing the threads at that end to more strongly grip the plate. The ends of the stays are not subject to the action of the fire, and the concave formation at $c^\times$ of the socket $c$ enables the body of water to approach nearer the end of the stay, some also circulating around the head, thereby keeping the head of the stay cool. By the flat or concave formation of that portion of the socket that is exposed to the fire the action of the fire on said sockets is limited to the same proportion as the action of the fire on the plate. The stay has a slight play in the sockets, which neutralizes the damaging effect of expansion and contraction.

In the modification shown in Fig. 5 one end only of the stay is provided with a socket, the other end of the stay being formed with a thread thereon and screwed into the plate.

I claim as my invention—

1. An improved flexible stay-bolt for steam-boilers, consisting of a bolt having an enlarged head, an externally-threaded socket enveloping the head, and means connecting the socket and the head to lock them from turning independently, substantially as described.

2. An improved flexible stay-bolt for steam-boilers, consisting of a bolt, having an enlarged head, a socket enveloping the head and having a retaining-lip, said socket being screw-threaded externally on the portion surrounding the enlarged head and the retaining-lip whereby on securing the socket in the boiler-plate and exerting tensional stress on the bolt, the enlarged head will tend to bind the socket in the plate and also prevent the head from pulling out of the socket, substantially as described.

3. An improved flexible stay-bolt for steam-boilers, consisting of a bolt having an enlarged head, a socket enveloping the head and screw-threaded externally on that portion that envelops the head, whereby on exerting tensional stress on the bolt the socket is more firmly held in place in the boiler-plate and more securely holds the enlarged head from pulling out in combination with projections between the head and socket to prevent their turning independently of each other, substantially as described.

In testimony whereof I have signed my name to this specification in the presence of two subscribing witnesses.

FREDERICK WILLIAM STROUDLEY.

Witnesses:
   THOS. PRESCOTT,
   JNO. HUGHES.